(12) United States Patent
Cesselli

(10) Patent No.: US 8,662,286 B2
(45) Date of Patent: Mar. 4, 2014

(54) PIVOT HOOK LIMITER FOR USE IN LUMBER SORTER

(75) Inventor: Mike Cesselli, Enderby (CA)

(73) Assignee: SEC Sawmill Equipment Company, Salmon Arm (CA)

(*) Notice: Subject to any disclaimer, the term of this patent is extended or adjusted under 35 U.S.C. 154(b) by 84 days.

(21) Appl. No.: 12/905,697

(22) Filed: Oct. 15, 2010

(65) Prior Publication Data
US 2012/0090960 A1    Apr. 19, 2012

(51) Int. Cl.
*B65G 17/20* (2006.01)
*B65G 17/32* (2006.01)

(52) U.S. Cl.
USPC .............. 198/680; 198/370.05; 198/377.1

(58) Field of Classification Search
None
See application file for complete search history.

(56) References Cited

U.S. PATENT DOCUMENTS

| | | | | |
|---|---|---|---|---|
| 2,900,150 | A | * | 8/1959 | Hirt et al. ............. 244/122 AB |
| 3,700,120 | A | * | 10/1972 | Romick et al. ............ 414/564 |
| 3,927,508 | A | * | 12/1975 | Campbell, III ............ 53/251 |
| 4,098,407 | A | | 7/1978 | Moore |
| 4,104,156 | A | | 8/1978 | Fletcher |
| 4,281,953 | A | | 8/1981 | Newnes |
| 4,430,915 | A | | 2/1984 | Rutherford |
| 4,972,154 | A | | 11/1990 | Bechtel et al. |
| 4,989,722 | A | * | 2/1991 | Kuepper ............... 198/475.1 |
| 5,476,355 | A | | 12/1995 | Bailey |
| 5,632,383 | A | | 5/1997 | Bailey |
| 5,660,423 | A | | 8/1997 | Herman et al. |
| 5,752,594 | A | * | 5/1998 | Fournier ............... 198/803.9 |
| 5,934,480 | A | | 8/1999 | Bailey |
| 6,662,925 | B2 | | 12/2003 | Franci |

FOREIGN PATENT DOCUMENTS

| | | |
|---|---|---|
| CA | 611759 | 1/1961 |
| CA | 661214 | 4/1963 |
| CA | 684949 | 4/1964 |
| CA | 745880 | 11/1966 |
| CA | 786670 | 6/1968 |
| CA | 605809 | 9/1969 |
| CA | 967109 | 5/1975 |
| CA | 984329 | 2/1976 |
| CA | 1050469 | 3/1979 |
| CA | 1123367 | 5/1982 |
| CA | 1146111 | 5/1983 |
| CA | 1206396 | 6/1986 |
| CA | 2184351 | 7/2003 |

* cited by examiner

*Primary Examiner* — Kavel Singh
(74) *Attorney, Agent, or Firm* — Shahrzad Esmaili; John R. S. Orange; Blake, Cassels & Graydon LLP

(57) ABSTRACT

A lumber sorter using a conveyor system with hooks that pick up, move and drop lumber. The lumber sorter includes limiters attached to the hooks that restrict the rotation of the hooks while the limiters are running in raceways. The limiters restrict the rotation of the hooks between a first and second orientation through the use of opposing contact points that contact with opposing walls of the raceways. The limiters maintain the hooks in a substantially vertical position while they carry lumber, but permit the hooks to be pivoted to drop the lumber at a designated position. The use of limiters having first and second contact points allows for the pivot direction and degree of rotation to be configurable and predetermined by the position and placement of the contact points.

7 Claims, 4 Drawing Sheets

PIVOT HOOK LIMITER FOR USE IN LUMBER SORTER

CROSS-REFERENCE TO RELATED APPLICATIONS

Not Applicable.

MICROFICHE APPENDIX

Not Applicable.

TECHNICAL FIELD

This invention relates lumber sorters for use in the lumber industry and more particularly a pivot hook limiter for use in a lumber sorter.

BACKGROUND

Lumber sorters are used in sawmills to sort lumber as it is produced from timber stock which is introduced into the sawmill to be cut into board lengths. During the course of processing of the timber stock into board lumber, various lengths of board lumber are produced from the timber stock of varying widths, thicknesses and lengths. To facilitate processing of like dimensioned board lumber, one or more of the dimensions of width, thickness or length of the board lumber are used for sorting. For example, certain dimensioned board lumber can be selected for processing into 8 foot 2×4's and this lumber can be sorted into a common bin or group of bins. The sorting of board lumber after initial cutting is generally carried out on an automated basis by a bin lumber sorting system. A bin lumber sorting system has a plurality of open topped bins to receive board lumber. The lumber to be sorted is provided to the bin lumber sorting system on a feed conveyor where it is transferred to a sorting conveyor. The sorting conveyor delivers the lumber to a target open topped bin to carry out the sorting process. In the bin lumber sorting system, it is the sorting conveyor that moves the lumber across a plurality of upwardly open bins to the open topped bin that is targeted to receive selected boards matching the dimensional parameters assigned to that bin. A typical bin lumber sorting system may include anywhere from tens to several hundreds of bins to receive the board lumber to be sorted.

There are existing board and lumber transport devices for transporting lumber to sorting bins that rely on a sorting conveyor system for example, a J-hook sorter, a push lug sorter, or a drag chain sorter.

FIG. 1 is a side elevation view of a portion of a lumber sorter known, for example, from Canadian patent application number 2,383,558 published on 2003-10-26, showing a portion of a feed conveyor 10 and a sort conveyor 20. Feed conveyor 10 delivers pieces of board lumber 12 along an upper surface 14, which may be, for example, a rail or a chain. Pieces of board lumber 12 are ambulated along upper surface 14 at predetermined intervals determined by the spacing of lugs 16 on upper surface 14. Upper surface 14 advances dependent on rotation of pulley 18 in a clockwise direction, which results in transport of pieces of board lumber 12 along upper surface 14 toward pulley 18, which may be a sprocket. Sort conveyor 20 obtains pieces of board lumber 12 from feed conveyor 10. Sort conveyor 20 has a pulley 22, which may be a sprocket, which rotates in a counter-clockwise direction to move a belt 34 (which may be a flexible belt or a chain, as desired) around the periphery of pulley 22 and in the direction of arrow 24. Hooks 26 are pivotally connected to belt 34 and are conveyed along with belt 34. As successive hooks 26 of sort conveyor 20 move laterally in approach to pulley 22, hooks 26 are supported in an inverted position by resting on support guide 28. Support guide 28 ends near pulley 22 permitting each hook 26 passing in the region between the end of support guide 28 and pulley 22 to rotate about pivot 30 to move hook shoulder 31 toward stop 32 of pulley 22. As the belt 34 conveys each hook 26 around the periphery of pulley 22, stop 32 restrains the rotation of each hook 26 to orient hook an opening 43 of each hook towards feed conveyor 10 in preparation to transfer pieces of board lumber 12 from supply conveyor 10 to the sort conveyor 20.

The transfer of pieces of board lumber 12 from feed conveyor 10 to sorting conveyor 20 occurs in the transfer region where the two conveyors overlap. To transfer pieces of board lumber 12, the distal end 36 of hook 26 is positioned below the upper surface 14 of the feed conveyor 10. When the hook 26 has reached a transfer point, hook 26 rotates about its pivot 30 to permit a support arm of hook 26 to descend below and pass beneath a piece of board lumber 12 on feed conveyor 10 in the direction of arrow 38. In this manner, lugs 16 and distal ends 36 of each of the hooks 26 define a transfer area for the pieces of board lumber 12 to be transferred from the feed conveyor 10 to the sorting conveyor 20.

Support guide 28 supports hooks 26 and belt 34 while they travel along the top run of sort conveyor 20. Support guide 29 supports hooks 26 and belt 34 as they travel along the bottom run of sort conveyor 20. While a hook 26 is travelling along support guide 29, it is free to rotate about pivot 30 and may rotate an undesirable amount. Undesirable excess rotation may cause improper functioning of the lumber sorter.

An apparatus for limiting the rotation of the hook is desired.

SUMMARY

Aspects of the present invention provide techniques for limiting the rotation of hooks within a lumber sorter through the use of a limiter.

One aspect of the present invention provides a lumber sorter having a belt running on a pair of opposed pulleys and a plurality of hooks pivotally connected to the belt, the lumber sorter comprising a raceway defined by a pair of vertically opposed walls separated by a predetermined distance and a respective limiter rigidly coupled to each hook, each limiter comprising first and second contact elements for engaging the walls of the raceway so as to thereby limit rotation of the hook to a range between a first orientation that is substantially orthogonal to the belt and a second orientation that is substantially parallel to the belt.

In one embodiment, the limiter is a rectangular block having one pair of diagonally opposed straight edges, and wherein the first contact element is a first one of the pair of diagonally opposed straight edges of the block and the second contact element is a second one of the diagonally opposed pair of straight edges of the block.

In another embodiment the lumber sorter has a respective positioning member associated with each pulley for guiding the limiter into the raceway in a select one of the two orientations such that when the positioning member releases the assembly, the assembly will counter-rotate under gravity to the other of the two orientations.

The above techniques can be implemented to control the rotation of hooks in a lumber sorter and thereby alleviate shortcomings of known lumber sorters.

BRIEF DESCRIPTION OF THE DRAWINGS

Representative embodiments of the invention will now be described by way of example only with reference to the accompanying drawings, in which.

It will be noted that throughout the appended drawings, like features are identified by like reference numerals.

DETAILED DESCRIPTION

In general, the present invention extends the techniques of prior lumber sorting systems by employing a limiter connected to a hook to limit the rotation of the hook while the limiter is within a raceway.

Figure 1:
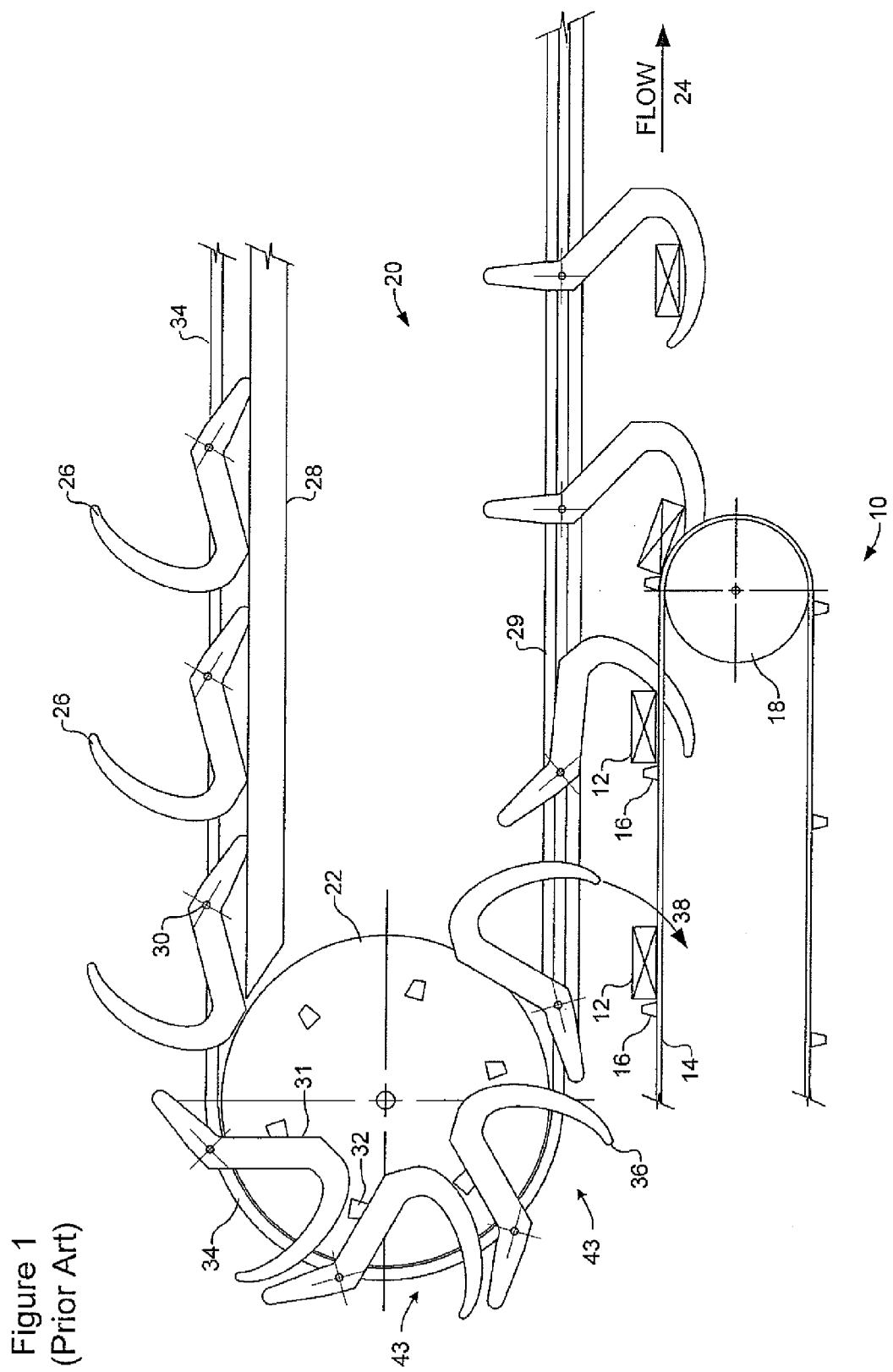
FIG. 1 is a side elevation diagram of an acquisition end portion of a known lumber sorter.
Figure 2:
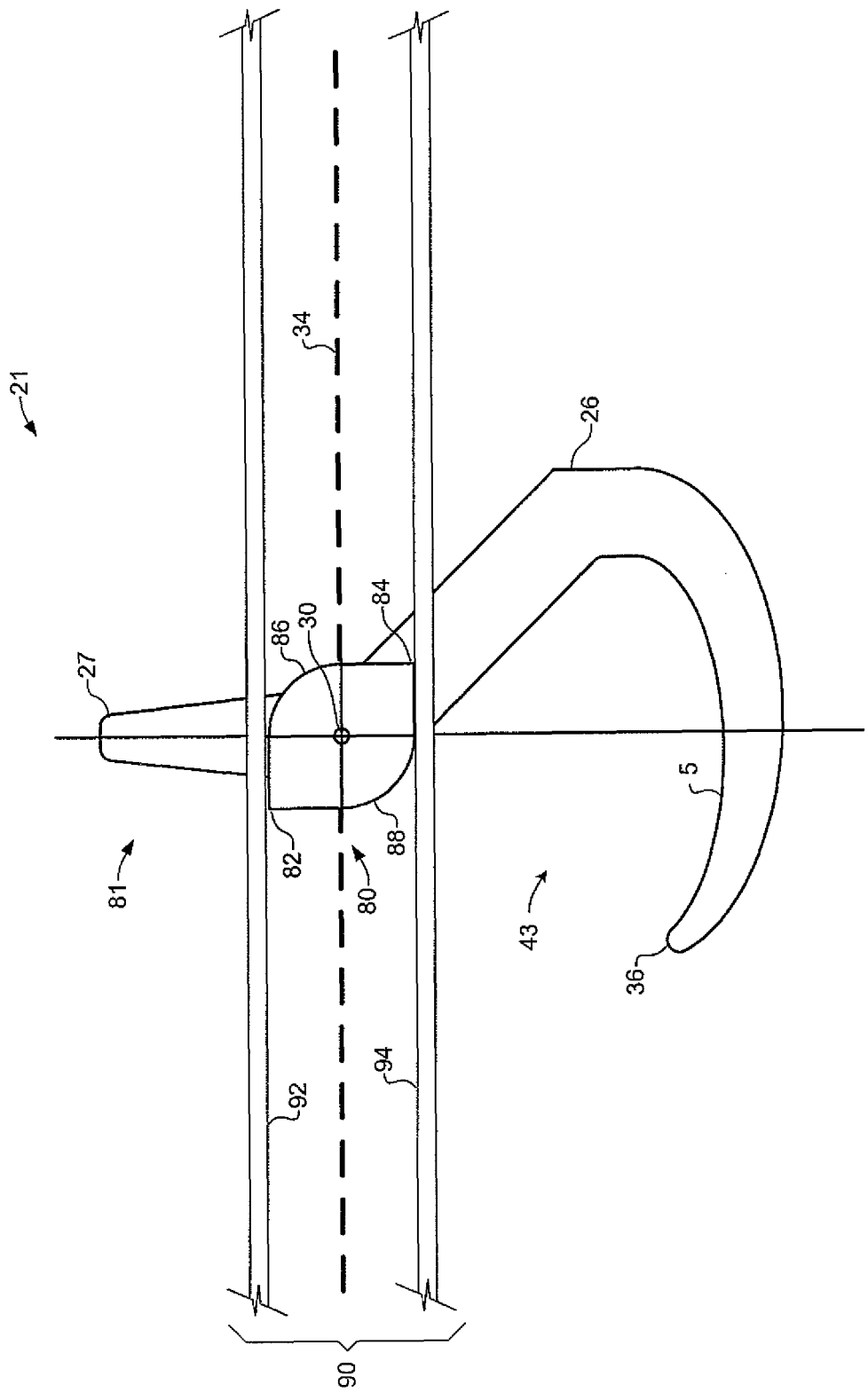
FIG. 2 is a side an elevation diagram of a hook and limiter assembly in a raceway usable in the present invention.

FIG. 2 is a side elevation view of a portion of a representative embodiment of a sort conveyor 21 of a lumber sorter constructed in accordance with principles of the present invention, showing generally a hook and limiter assembly in a raceway. Sort conveyor 21 has a hook 26 for picking up, moving and dropping pieces of board lumber. Hook 26 has a head portion 27, a distal end 36 and an opening 43. Hook 26 has a carrying portion 5 for carrying pieces of board lumber. Hook 26 is pivotally connected to a belt 34 at a pivot 30 such that it can rotate with respect to belt 34. Also connected to hook 26 is a limiter 80 which is connected to hook 26 about pivot 30. Hook 26 and limiter 80 form an assembly 81. Limiter 80 is shown running within a raceway 90 which is comprised of an upper wall 92 and a lower wall 94. Raceway 90 may be provided as an elongate channel defined by the vertically opposed upper wall 92 and lower wall 94. The distance between upper wall 92 and lower wall 94 is predetermined according to the shape and/or size of limiter 80. Limiter 80 will have at least one dimension that is longer than the distance between upper wall 92 and lower wall 94 to impede rotation of limiter 80 within raceway 90.

In the embodiment shown in FIG. 2, limiter 80 is a block with a first contact element 82, a second contact element 84, a first rounded edge 86 and a second rounded edge 88. First contact element 82 and second contact element 84 are positioned apart from each other at a distance that is greater than the width of raceway 90 as formed by upper wall 92 and lower wall 94. In operation, limiter 80 can rotate within raceway 90 upon rounded edges 86, 88 until first contact element 82 and second contact element 84 contact raceway walls 92, 94. Continued rotation is arrested because the width formed by first and second contact elements 82, 84 is greater than the width of raceway 90 as formed by walls 92, 94. In the embodiment shown in FIG. 3, first contact element 82 and second contact element 84 restrain limiter 80 from rotating clockwise, but do permit counter-clockwise rotation if force is applied to counter-act gravity. Because hook 26 is connected to limiter 80 to form assembly 81, assembly 81, and therefore hook 26, are also limited in their rotation accordingly.

Alternative embodiments permit different configurations of the degree of rotation of limiter 80 within raceway 90 by, for example, altering the location of contact elements 82, 84. For example, the rotation of limiter 80 within raceway 90 may be reduced below 90 degrees by including a lug (not shown) on limiter 80 between first contact element 82 and second rounded edge 88 and between second contact element 84 and first rounded edge 86. In this embodiment the lugs become alternate contact elements that meet walls 92, 94 of raceway 90 and restrict continued rotation before limiter 80 has rotated 90 degrees.

Another alternative embodiment has a limiter that is not comprised of a block. For example, first and second contact elements 82, 84 may be pegs (not shown) or ends of a rigid elongate member (not shown). The pegs or ends of the rigid elongate member limit the continued rotation of limiter 80 once they contact walls 92, 94 of raceway 90 because they are spaced apart at a distance that is greater than the separation between walls 92, 94.

Figure 3A:
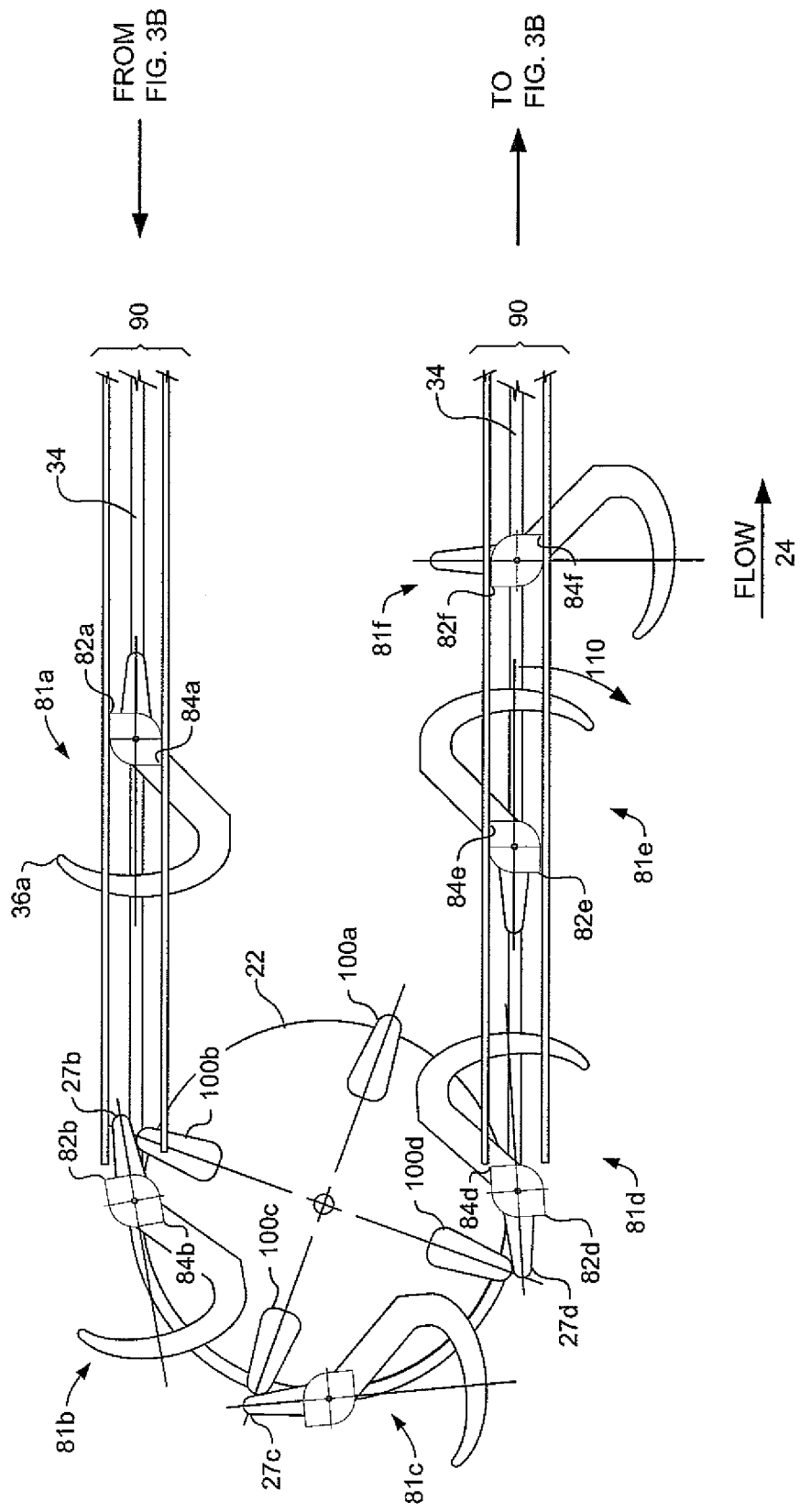
FIG. 3A is another side elevation diagram of six hook and limiter assemblies travelling counter-clockwise around a pulley in a conveyor system usable in the present invention.

FIG. 3A is another side elevation diagram of a portion of sort conveyor 21 constructed in accordance with the principles of the present invention showing generally six hook and limiter assemblies 81 travelling counter-clockwise around a pulley 22 in the direction of arrows 24. The operation of limiters 80 in sorting pieces of board lumber is described with reference to the assemblies 81 shown in the diagram, proceeding counter-clockwise from assembly 81$a$ through to 81$f$.

Assembly 81$a$ is travelling within raceway 90$a$ in a first orientation. First contact element 82$a$ is in contact with upper wall 92$a$ and second contact element 84$a$ is in contact with lower wall 94$a$, preventing the downward rotation of distal end 36$a$ under gravity. First contact element 82$a$, upper wall 92$a$, second contact element 84$a$, lower wall 94$a$ and gravity maintain assembly 81$a$ in the first orientation relative to belt 34. The application of pivotal force to assembly 81$a$ in a counter-clockwise direction rotates 81$a$ in a counter-clockwise direction up to about 90 degrees, until first contact element 82$a$ meets lower wall 94$a$ and second contact element 84$a$ meets upper wall 92$a$, at which point further counter-clockwise rotation is impeded and a clockwise rotation will be effected by gravity once the applied force ceases.

Assembly 81$b$ is exiting from raceway 90$a$ in the first orientation. As assembly 81$b$ exits raceway 90$a$ first contact element 82$b$ and second contact element 84$b$ come out of contact with the walls of raceway 90$a$. As assembly 81$b$ exits raceway 90$a$, lug 100$b$, which is connected to pulley 22, rotates into contact with head portion 27$b$. The rotation of assembly 81$b$ under gravity is impeded by the contact between lug 100$b$ and head portion 27$b$ such that assembly 81$b$ is maintained in the first orientation relative to belt 34.

Assembly 81$c$ is rotating along the periphery of pulley 22 in the first orientation. As assembly 81$c$ rotates along the periphery, lug 100$c$ rotates with pulley 22 and maintains contact with head portion 27$c$. The rotation of assembly 81$c$ under gravity is impeded by the contact between lug 100$c$ and head portion 27$c$ such that assembly 81$c$ is maintained in the first orientation relative to belt 34.

Assembly 81$d$ is continuing to rotate along the periphery of pulley 22 such that limiter 80$d$ is being guided to entry within raceway 90$b$ in the first orientation. Lug 100$d$ ensures that assembly 81$d$ is in the proper orientation as limiter 80$d$ enters raceway 90$b$. The rotation of assembly 81$d$ under gravity is impeded by the contact between lug 100$d$ and head portion 27$d$ such that assembly 81$d$ is maintained in the first orientation relative to belt 34 and is in a suitable orientation for the entry of limiter 80$d$ within raceway 90$b$. As lug 100$d$ guides limiter 80$d$ into raceway 90$b$, first contact element 82$d$ and second contact element 84$d$ come into contact with lower wall 94$b$ and upper wall 92$b$ respectively.

Assembly 81e is travelling within raceway 90b in the first orientation and has just been released from contact between head portion 27e and lug 100e. First contact element 82e is in contact with lower wall 94b and second contact element 84e is in contact with upper wall 92b. Upon release by lug 100e, assembly 81e rotates clockwise about 90 degrees under gravity on rounded edges 86e, 88e to the second orientation, as indicated by arrow 110.

Assembly 81f is travelling within raceway 90b and has just rotated clockwise about 90 degrees under gravity along the direction of arrow 110 to a second orientation. First contact element 82f is in contact with upper wall 92b and second contact element 84f is in contact with lower wall 94b, preventing the continued clockwise rotation of assembly 81f beyond the second orientation. First contact element 82f, upper wall 92b, second contact element 84f, lower wall 94b and gravity maintain assembly 81f in the second orientation relative to belt 34. The application of pivotal force to assembly 81f in a counter-clockwise direction rotates 81f in a counter-clockwise direction up to about 90 degrees, until second contact element 84f meets upper wall 92b and first contact element 82f meets lower wall 94b, at which point further counter-clockwise rotation is impeded and a clockwise rotation will be effected by gravity once the applied force ceases.

Figure 3B:
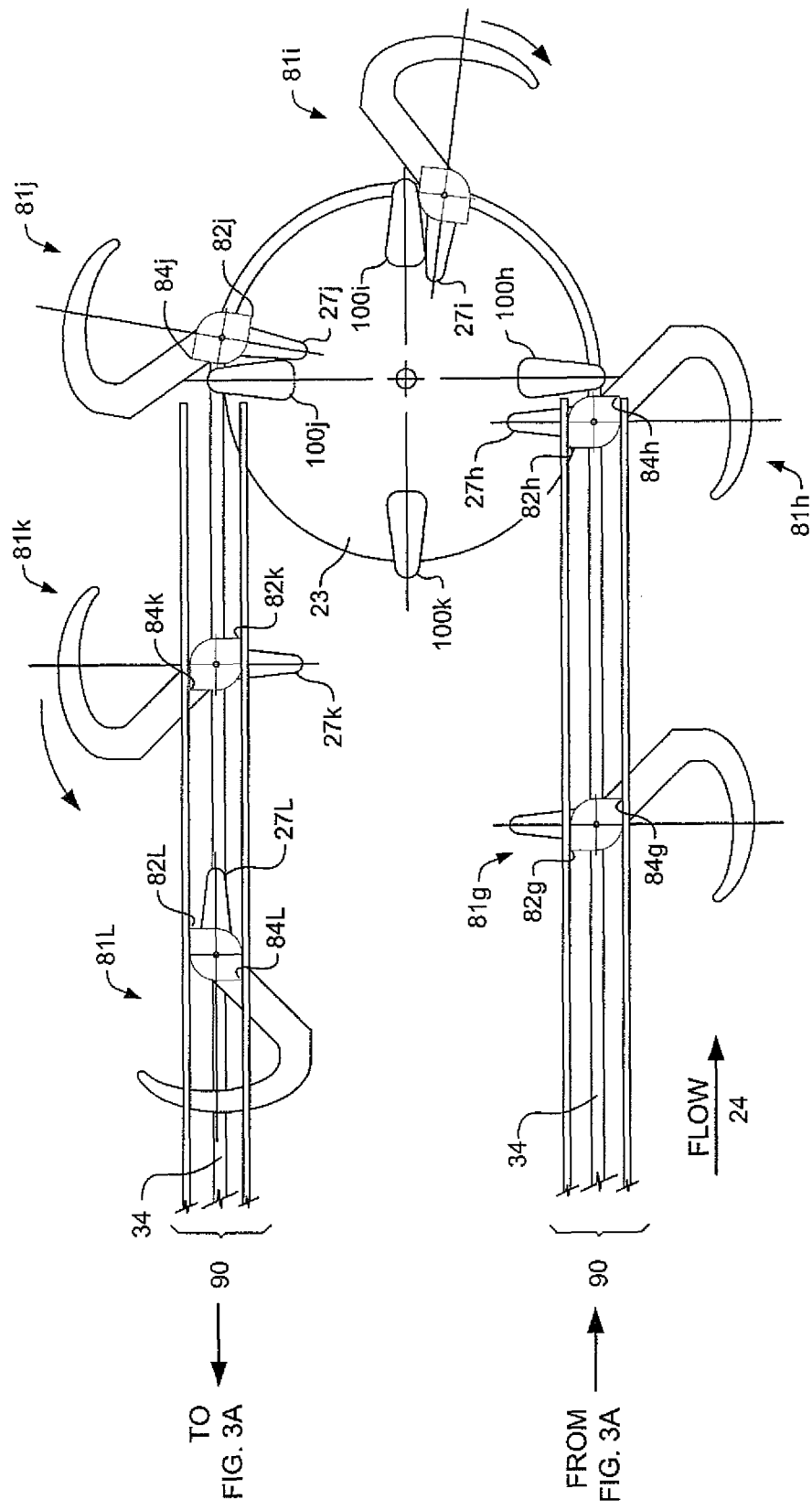
FIG. 3B is a continuation of FIG. 3A showing a side elevation diagram of six hook and limiter assemblies travelling counter-clockwise around a pulley in a conveyor system usable in the present invention.

FIG. 3B is a continuation of FIG. 3A showing another portion of sort conveyor 21 constructed in accordance with the principles of the present invention showing generally six hook and limiter assemblies 81 travelling counter-clockwise around a pulley 23 in the direction of arrows 24. The operation of limiters 80 in sorting pieces of board lumber is described with reference to the assemblies 81 shown in the diagram, proceeding counter-clockwise from assembly 81g through to 81L.

Assembly 81g is travelling within raceway 90b in the second orientation. First contact element 82g is in contact with upper wall 92b and second contact element 84g is in contact with lower wall 94b, preventing continued rotation under gravity. First contact element 82g, upper wall 92b, second contact element 84g, lower wall 94b and gravity maintain assembly 81g in the second orientation relative to belt 34. The application of pivotal force to assembly 81g in a counter-clockwise direction rotates 81g in a counter-clockwise direction up to about 90 degrees, until second contact element 84g meets upper wall 92b and first contact element 82g meets lower wall 94b, at which point further counter-clockwise rotation is impeded and a clockwise rotation will be effected by gravity once the applied force ceases.

Assembly 81h is exiting from raceway 90b in the second orientation. As assembly 81h exits raceway 90b first contact element 82h and second contact element 84h come out of contact with the walls of raceway 90b. As assembly 81h exits raceway 90b, lug 100h, which is connected to pulley 23, rotates into contact with head portion 27h. The rotation of assembly 81h under gravity is impeded by the contact between lug 100h and head portion 27h such that assembly 81h is maintained in the second orientation relative to belt 34.

Assembly 81i is rotating along the periphery of pulley 23 in the second orientation. As assembly 81i rotates along the periphery, lug 100i rotates with pulley 23 and maintains contact with head portion 27i. The rotation of assembly 81i under gravity is impeded by the contact between lug 100i and head portion 27i such that assembly 81i is maintained in the second orientation relative to belt 34.

Assembly 81j is continuing to rotate along the periphery of pulley 23 in the second orientation such that limiter 80j is being guided to entry within raceway 90a. Lug 100j ensures that assembly 81j is in the proper orientation as limiter 80j enters raceway 90a. The rotation of assembly 81j under gravity is impeded by the contact between lug 100j and head portion 27j such that assembly 81j is maintained in the second orientation relative to belt 34 and is in a suitable orientation for the entry of limiter 80j within raceway 90a. As lug 100j guides limiter 80j into raceway 90a, first contact element 82j and second contact element 84j come into contact with lower wall 94a and upper wall 92a respectively.

Assembly 81k is travelling within raceway 90a in the second orientation and has just been released from contact between head portion 27k and lug 100k. First contact element 82k is in contact with lower wall 94a and second contact element 84k is in contact with upper wall 92a. Upon release by lug 100k, assembly 81k rotates counter-clockwise about 90 degrees under gravity on rounded edges 86k, 88k to the second orientation, as indicated by arrow 111.

Assembly 81L is travelling within raceway 90a and has just rotated counter-clockwise about 90 degrees under gravity along the direction of arrow 111 to the first orientation. First contact element 82L is in contact with upper wall 92a and second contact element 84L is in contact with lower wall 94a, preventing the continued counter-clockwise rotation of assembly 81L beyond the first orientation. First contact element 82L, upper wall 92a, second contact element 84L, lower wall 94a and gravity maintain assembly 81L in the first orientation relative to belt 34.

As shown in FIGS. 3A and 3B, gravity is used to transition assembly 81 from one orientation to the other. Between transitions, limiter 80, raceway walls 92, 94 and lug 100 cooperate to maintain the assembly 81 in its current orientation. Before it is transitioned, assembly 81 is moved from one raceway to another while held by a lug to restrain its rotation relative to the belt. Once assembly 81 has been moved to the other raceway, it is released by the lug allowing gravity to transition assembly 81 to the other orientation. The transition from the first orientation to the second orientation allows hook 26 to pick up pieces of board lumber from a feed conveyor. This arrangement allows for assembly 81 to be rotated to a dropping position by diverter lug 42 and counter-rotated by gravity to a resting, or carrying, position and no further.

In the foregoing description, assembly 81 rotates from one orientation to the other under the force of gravity. However, this is not essential. If desired, mechanical means may be used to force rotation of the assembly 81, either acting with or against the force of gravity.

Now that the invention has been described, numerous modifications, substitutions and mechanical equivalents will occur to those skilled in the art. The invention is not limited to the preferred embodiments described herein with reference to the described drawings, but is defined in the claims appended hereto.

I claim:

1. A lumber sorter having a belt running on a pair of opposed pulleys and a plurality of hooks pivotally connected to the belt at a pivot, the lumber sorter comprising:
a raceway defined by a pair of vertically opposed walls separated by a predetermined distance; and
a respective limiter rigidly coupled to each hook for movement with the hook about the pivot, each limiter comprising first and second contact elements each for engaging a respective one of the walls of the raceway so as to thereby limit rotation of the hook to a range between a first orientation that is substantially aligned with the belt and a second orientation that is substantially orthogonal to the belt.

2. The lumber sorter of claim 1 wherein the limiter comprises a rectangular block having one pair of diagonally opposed straight edges, and wherein:
  the first contact element is a first one of the pair of diagonally opposed straight edges of the block; and
  the second contact element is a second one of the diagonally opposed pair of straight edges of the block.

3. The lumber sorter of claim 2 wherein the limiter further comprises a pair of diagonally opposed rounded surfaces adapted to support the hook in the raceway when the hook is at an intermediate orientation between the first and second orientations.

4. The lumber sorter of claim 1 further comprising:
  a respective positioning member associated with each pulley for guiding the limiter into the raceway in a select one of the two orientations such that when the positioning member releases the hook, the hook will counter-rotate under gravity to the other of the two orientations.

5. The lumber sorter of claim 4 wherein the positioning member comprises:
  a restrainer for restraining the assembly from rotation from the select one of the two orientations; and
  a guider for guiding the limiter into the raceway while the hook is restrained and then releasing the hook, such that the hook counter-rotates under gravity to the other of the two orientations.

6. The lumber sorter of claim 4 wherein the positioning member comprises at least one lug connected to a respective one of the pulleys, the lug for:
  receiving the assembly as the limiter exits the raceway;
    restraining the assembly in a current one of the two orientations while the hook travels with the rotating periphery of the pulley; and
    guiding the limiter within another raceway and then releasing the hook, such that the hook counter-rotates under gravity to the other of the two orientations.

7. The lumber sorter of claim 1 further comprising a guide connected to the hook for guiding the hook as it travels through the raceway.

* * * * *